July 25, 1972  J. JACK ET AL  3,679,391
FERTILIZER COMPOSITIONS
Filed April 18, 1968  5 Sheets-Sheet 1

0.2% Fuel Oil
+ 2% (AK + 1% $C_{14}H_{29}Si(OEt)_3$)

0.2% Fuel Oil
+ 2% $AKO_1$ 0.2% Fuel Oil
+ 2% (AK + 1% $C_{14}H_{29}Si(OEt)_3$)

0.2% Fuel Oil
+ 2% Winnofil

INVENTORS
JAMES JACK
JOHN DRAKE
DAVID CROMPTON THOMPSON
FREDERICK JOHN HARRIS

By Cushman, Darby & Cushman
Attorneys

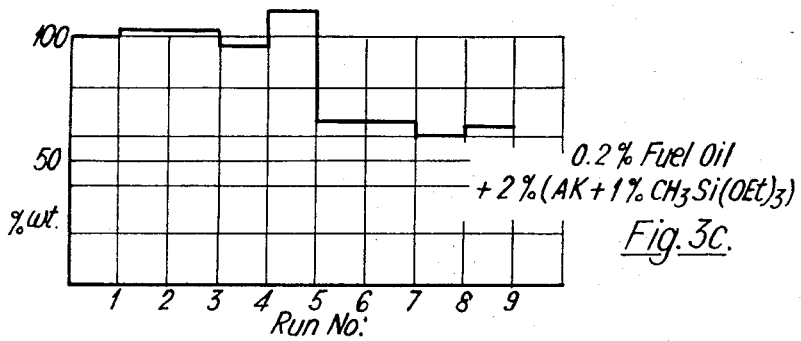
Fig. 3C. 0.2% Fuel Oil + 2%(AK+1% CH₃Si(OEt)₃)
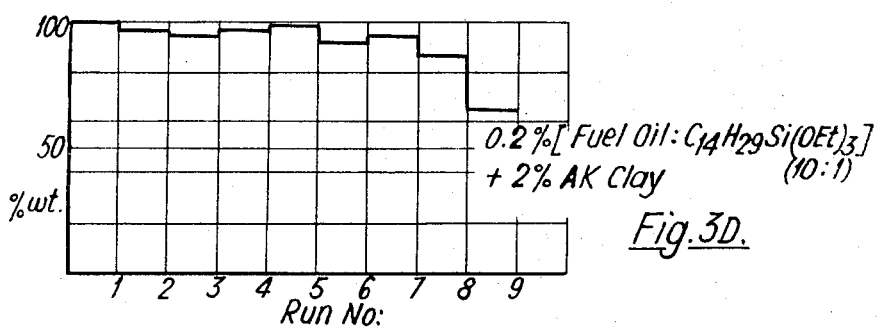
Fig. 3D. 0.2%[Fuel Oil:C₁₄H₂₉Si(OEt)₃] (10:1) + 2% AK Clay
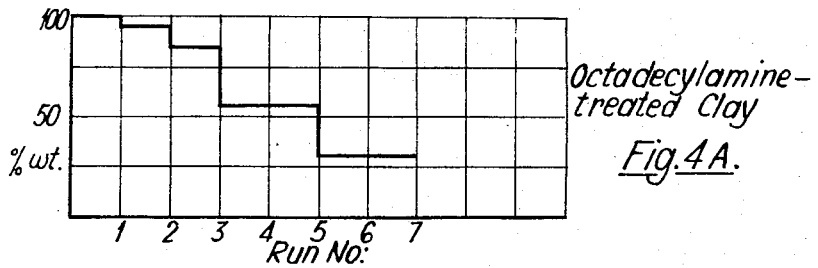
Fig. 4A. Octadecylamine-treated Clay
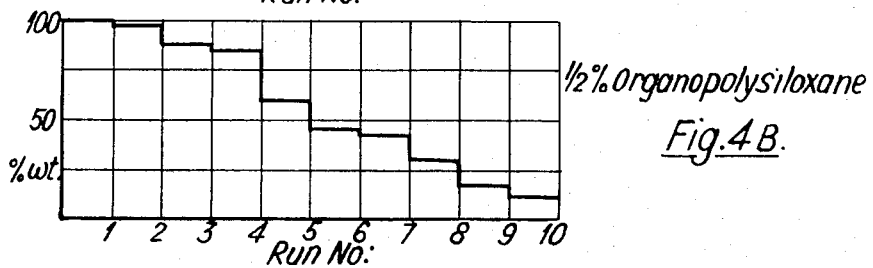
Fig. 4B. ½% Organopolysiloxane
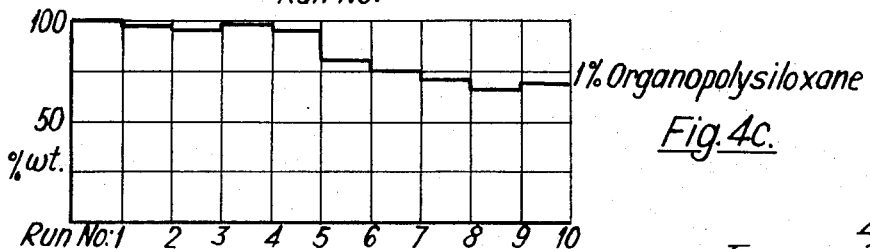
Fig. 4C. 1% Organopolysiloxane
INVENTORS
JAMES JACK
JOHN DRAKE
DAVID CROMPTON THOMPSON
FREDERICK JOHN HARRIS
By Cushman, Darby & Cushman
Attorneys July 25, 1972 J. JACK ET AL 3,679,391
FERTILIZER COMPOSITIONS
Filed April 18, 1968 5 Sheets-Sheet 5
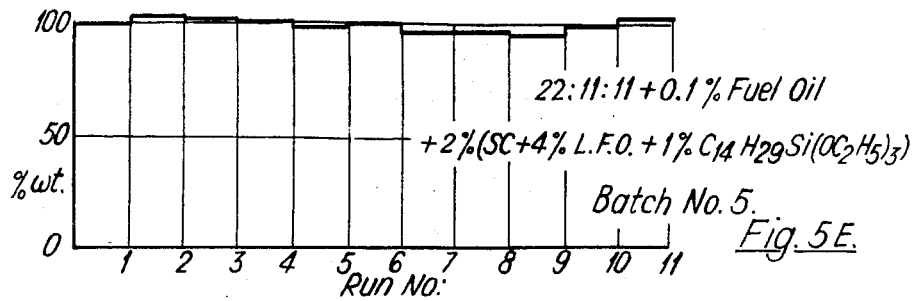
Fig. 5E. Batch No. 5. 22:11:11 + 0.1% Fuel Oil + 2%(SC + 4% L.F.O. + 1% $C_{14}H_{29}Si(OC_2H_5)_3$)
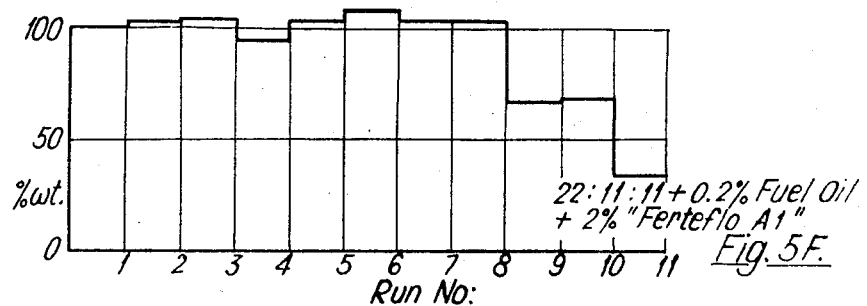
Fig. 5F. 22:11:11 + 0.2% Fuel Oil + 2% "Ferteflo A1"
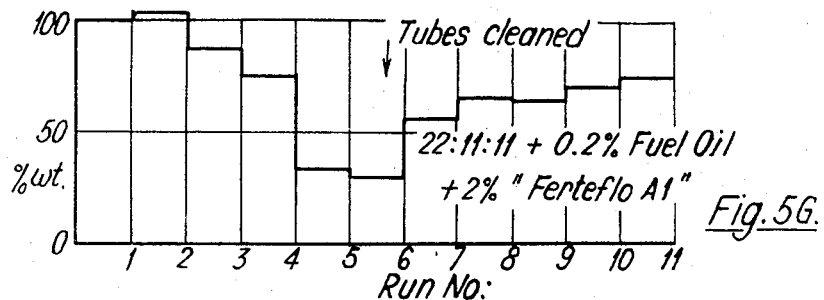
Fig. 5G. Tubes cleaned. 22:11:11 + 0.2% Fuel Oil + 2% "Ferteflo A1"
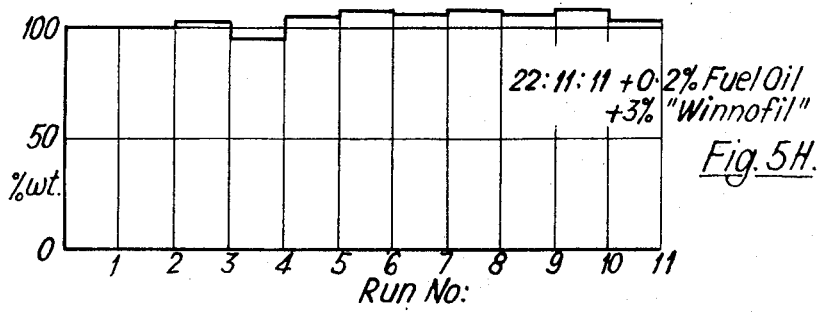
Fig. 5H. 22:11:11 + 0.2% Fuel Oil + 3% "Winnofil"
INVENTORS
JAMES JACK
JOHN DRAKE
DAVID CROMPTON THOMPSON
FREDERICK JOHN HARRIS
By Cushman, Darby & Cushman
Attorneys United States Patent Office 3,679,391
Patented July 25, 1972

3,679,391
FERTILIZER COMPOSITIONS
James Jack, Troon, and John Drake, Ardrossan, Scotland, David Crompton Thompson, Norton-on-Tees, England, and Frederick John Harris, Edinburgh, Scotland, assignors to Imperial Chemical Industries Limited, London, England, and Scottish Agricultural Industries Limited, Edinburgh, Scotland
Filed Apr. 18, 1968, Ser. No. 722,498
Claims priority, application Great Britain, Apr. 24, 1967, 18,781/67; June 7, 1967, 26,317/67
Int. Cl. C09k 3/00
U.S. Cl. 71—64 E                    9 Claims

ABSTRACT OF THE DISCLOSURE

Fertilizer compositions, for example granular fertilizers containing ammonium nitrate or urea, having improved free-flowing properties, resistance to caking and drillability, are provided with a coating comprising a silicon compound selected from silanes (exemplified by alkyltrialkoxy silanes) and organopolysiloxanes (exemplified by cyclic and linear alkyl hydrogen siloxanes) which are efficacious even when applied at room temperature.

Figure 1A:
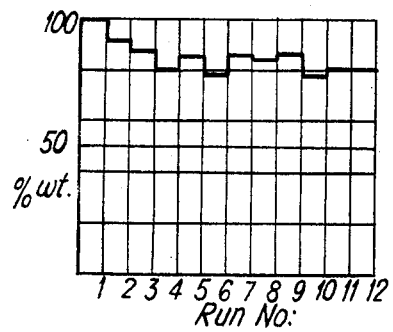

This invention relates to improved fertilizer compositions, especially granular fertilizers consisting of or containing hygroscopic ingredients such as ammonium nitrate and/or urea, in particular granular compound fertilizers containing ammonium nitrate, having improved free-flowing properties, improved resistance to caking and improved drillability (that is to say, of reduced tendency to block the machinery used to distribute them on the land).

It has already been proposed to treat fertilizers in granular or powder form, so as to inhibit the caking of the granules or particles thereof, by mixing the fertilizers with 1% to 10% by weight of another powder (for example, calcium carbonate, clay, kaolin and other mineral powders), the particles of which have been coated with a silicone. We have, however, established that, with certain exceptions, silanes and silicones exhibit poor anti-caking properties when applied at room temperature and become effective for this purpose only if they are reacted with the coating powder at a high temperature (e.g. of the order of 250° C. when the coating powder is clay). Examples of silicones and silanes which require such heat-treatment in order to develop their maximum effectiveness include dimethylpolysiloxanes, methyloctylpolysiloxanes, methyltetradecylpolysiloxanes, organopolysiloxane resins, diphenylsilanediol and chlorosilanes (which latter are, in any case, obnoxious to use by reason of the hydrochloric acid fumes which they evolve). The troublesome, time-consuming and expensive heat-treatment which these silicones require render them unattractive for the purpose of coating fertilizers.

The exceptions referred to hereinabove, which we have found to have effective anti-caking properties even when applied at room temperature are of two kinds, namely (1) Silanes of the general Formula I

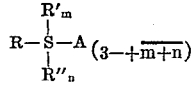

Formula I wherein R is a linear or branched alkyl group having from 1 to 30 carbon atoms, R' and R" are hydrocarbyl groups having not more than 22 carbon atoms, e.g. alkyl or aryl groups and preferably methyl or phenyl groups, A is a hydrolysable group other than a halogen, $m$ and $n$ are 0, 1 or 2, and $m+n \not> 2$. The hydrocarbyl groups R' and R" may be alkyl, aryl, aralkyl or cyclo-alkyl groups. Suitable groups include, for example, methyl, phenyl, β-phenylethyl, p-tolyl and cyclohexyl groups. In general methyl groups are preferred. The hydrolysable groups A may be hydrocarbyloxy groups, preferably having not more than 6 carbon atoms, including for example, alkoxy, aroxy and cycloalkoxy groups. Suitable groups which may be used, for example, are methoxy, ethoxy, phenoxy and cyclohexoxy groups. When the groups A are hydrocarbyloxy groups it is in general preferred that they be methoxy or ethoxy groups. Alternatively the groups A may be substituted hydrocarbyloxy groups of the general formula $(OC_yH_{2y})_nOR'''$ in which $y$ is 2 or 3, $n$ is 0 or a positive integer and R''' is an amino-substituted or unsubstituted hydrocarbyl group. When the groups A are such groups it is not necessary for $y$ to have the same value in all the oxyalkylene groups in any one group A are such groups cases it may in fact be desirable that a mixture should be present.

(2) Organopolysiloxanes of the average general Formula II $$(R'_dH_eSiO)_a(R'_bH_cSiO)_n(SiH_eR'_d)_a$$

Formula II wherein the groups R', which may be the same or different, are as defined in Formula I hereinabove.

$a$ is 0 or 1,
$b$ is 1 or 2,
$c$ is 0 or 1,
$b+c=2$,
$d$ is 1, 2 or 3,
$e$ is 0, 1 or 2,
$d+e=3$,
$n$ is a positive integer, and

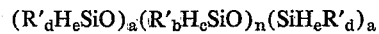

is not less than 3/20

In these organopolysiloxanes the values of $b$ and $c$ need not necessarily be the same in all of the units $(R'_bH_cSiO)$. When $a$ is 0, $n$ is preferably not greater than 9 and $c$ is preferably 1 in all of the said units. It is further preferred in such cases that $n$ should have a value of from 3 to 5. When $a$ is 1 and not all of the said units have $c=1$, the value of $n$ may be as high as e.g. 800 but is preferably not more than 100 and is further preferred to be from 50 to 60. When $a$ is 1 and $c$ is 1 in all of the said units, it is generally preferred that $n$ should be not greater than 60.

Individual members of the said two kinds of silanes and organopolysiloxanes are hereinafter referred to as "a silane" or "an organopolysiloxane" respectively, "of the kind described."

Silanes and organopolysiloxanes of the kinds described, in addition to enhancing the resistance of fertilizer compositions to caking, also improve their free-flowing properties and drillability. The fertilizer may be coated with silanes or organopolysiloxanes of the kinds described in, for example, the following ways:

(1) The silane or organopolysiloxane may first be incorporated in or on a suitable finely-divided inert coating material which is subsequently used to coat the fertilizer particles, granules or the like.

(2) The fertilizer particles, granules or the like may first be coated with a layer of oil, and thereafter with a suitable finely-divided inert coating material having the silane or organopolysiloxane incorporated therein or thereon.

(3) The silane or organopolysiloxane may be dissolved or dispersed in a hydrocarbon solvent or dispersing agent, for example an oil or liquid paraffin, and the resulting solution or dispersion is subsequently used to coat the fertilizer particles, granules or the like; the fertilizer particles, granules or the like are preferably subsequently further coated with a suitable finely-divided inert coating material.

(4) The silane or organopolysiloxane may be dissolved or dispersed in a hydrocarbon solvent or disersing agent, for example in an oil or liquid paraffin, the resulting solution or dispersion is incorporated in or on a suitable finely-divided inert coating material, and the fertilizer particles, granules or the like are coated with the so-treated finely-divided inert coating material.

In its broadest aspect, therefore, the invention provides fertilizer compositions, especially granular fertilizers consisting of or containing hygroscopic ingredients such as ammonium nitrate and/or urea, in particular granular compound fertilizers containing ammonium nitrate, having improved free-flowing properties, improved resistance to caking and improved drillability, which comprise particles, granules or the like of the fertilizer having a coating which includes at least one silicon compound selected from a silane of Formula I or an organopolysiloxane of Formula II.

According to a preferred embodiment of the present invention there are provided fertilizer compositions, especially granular fertilizers consisting of or containing hygroscopic ingredients such as ammonium nitrate and/or urea, in particular granular compound fertilizers containing ammonium nitrate, having improved free-flowing properties, improved resistance to caking and improved drillability, which comprise particles, granules or the like of the fertilizer coated with a composition comprising a suitable finely-divided inert coating material having incorporated therein or thereon at least one silicon compound selected from a silane of Formula I or an organopolysiloxane of Formula II.

The inert coating material is suitably, for example, ground chalk, precipitated calcium carbonate, anhydrite, basic slag, limestone dust, rock phosphate, ball clays (e.g. "AK" clay), china clays (e.g. Kaolin "GYD DIS" and Kaolin "CHYNO No. 3"), of a particle size sufficiently small to produce a suitable coating, but not so small as to necessitate the use of an uneconomically large amount of silane or organopolysiloxane. The proportion of finely-divided inert coating material to fertilizer particles, granules or the like is not critical but preferably should not exceed that at which the inert material becomes detached from the fertilizer so that it is present as dust. Suitable proportions of inert material on granular fertilizers are, for example, up to 4% (calculated on the weight of the coated product), preferably 1% to 3%, in particular 2%.

The proportion of silane or organopolysiloxane, by weight of the inert coating material, should be at least 0.25%. The upper limit is normally dictated by questions of expense, and for this reason should not exceed 3.5%; a realistic upper limit is about 3%. The preferred proportion is between about 0.5% and 2%.

The silanes according to Formula I which have been found to be particularly useful for the purpose of this invention are alkyltriethoxy silanes wherein the group R is a straight-chain alkyl group containing from 1 to 30, in particular 8 to 18, carbon atoms. Silanes of Formula I, wherein the group R is a straight-chain alkyl group containing 14 carbon atoms are described and claimed in copending British patent application No. 18,782/67, and are among those silanes which are particularly useful for this invention.

The organopolysiloxanes according to Formula II which have been found to be particularly useful for this invention are cyclic methyl hydrogen siloxanes of formula $(Me_bH_cSiO)_n$, and linear methyl hydrogen siloxanes of formula $Me_3SiO(Me_bH_cSiO)_nSiMe_3$, in which, of course, $c$ cannot be 0 throughout the group $(Me_bH_cSiO)_n$. We have observed that the organopolysiloxanes of this kind which are particularly suitable for our invention are those in which $c$ is 1 throughout the group $(Me_bH_cSiO)_n$.

Experiments were carried out, as described in the following examples, to determine the ability of the silanes and organopolysiloxanes of the kinds described to impart good anti-caking properties and good drillability to dfiierent granular fertilizers, the silanes and organopolysiloxanes being applied to the fertilizers in varying quantities, in varying ways, in association with varying quantities of different finely-divided inert materials.

EXAMPLE I

Silanes of Formula I were coated onto a granular fertilizer consisting of ammonium nitrate, ammonium phosphate and potassium chloride and having a plant nutrient analysis of 23:11:11 expressed as $N:P_2O_5:K_2O$. The silanes were used in a variety of ways which will be evident from Table I and Ia hereinafter; most were applied (for example, in a homogenizer, food mixer or ball mill) to a finely-divided inert coating material (substantially all passing a 300 B.S. mesh sieve) selected from:

"AK" clay (a ball clay)

Gypsum

Phosphate rock the amount of silane added being 0.5%, 1% or 2% by weight of the coating material. The fertilizer granules were first coated with 0.2% by weight of fuel oil and thereafter with 2% by weight of the silane-treated coating material (Table I). In two cases, however, (Table Ia) the silanes were incorporated in the 0.2% layer of fuel oil with which the fertilizer granules were first coated (the oil/silane coating layer being a 20:1 or 10:1 mixture) and the fertilizer granules were subsequently coated with the untreated finely-divided inert coating material. In one instance (Table Ia), the silane was present not only in the oil coating layer but also in the finely-divided inert coating material.

Each of these fertlizers was stored under conditions simulating storage at both atmospheric and elevated temperatures in polythene bags for two months under 40 1-cwt. bags pressure and was subsequently examined for anti-caking properties and compared with the same fertilizer when treated with 2% of $AKO_1$ (ball clay AK treated with 1% of its own weight of octadecylamine). The cold-caked and hot-caked samples were also subjected to a float test (a measure of their drillability) in which the coated granules were placed on the surface of a saturated aqueous solution of the fertilizer; those which floated for 3 minutes, or more, are considered to be of acceptable drillability.

The results of these anti-caking and drillability tests are set forth in the following Tables I and Ia.

TABLE I

| Silane | Percent silane on coating material | Inert coating material | Caking room temp. | Caking, 50° C. | Float test |
|---|---|---|---|---|---|
| $CH_3Si(OEt)_3$ | 1.0 | AK ball clay | XXXX | XXX | XXXX |
| $C_4H_9Si(OEt)_3$ | 1.0 | ...do... | XXXX | XXX | XXXX |
| $C_8H_{17}Si(OEt)_3$ | 0.5 | ...do... | XXX | XXX | XXXX |
| $C_8H_{17}Si(OEt)_3$ | 1.0 | ...do... | XXXX | XXXX | XXXX |
| $C_{14}H_{29}Si(OEt)_3$ | 0.1 | ...do... | XXX | XXX | XXX |
| $C_{14}H_{29}Si(OEt)_3$ | 0.5 | ...do... | XXX | XXX | XXXX |
| $C_{14}H_{29}Si(OEt)_3$ | 1.0 | ...do... | XXXX | XXXX | XXXX |
| $C_{14}H_{29}Si(OEt)_3$ | 2.0 | ...do... | XXXX | XXXX | XXXX |
| $C_{14}H_{29}Si(Me)(OEt)_2$ | 1.0 | ...do... | XXX | XXX | XXXX |
| $C_{18}H_{37}Si(OEt)_3$ | 1.0 | ...do... | XXXX | XXXX | XXXX |
| $C_{14}H_{29}Si(OEt)_3$ | 1.0 | Gypsum | XX | X | XXXX |
| $C_{18}H_{37}Si(OEt)_3$ | 1.0 | Phosphate rock | XX | XX | XXXX |

In all the above silanes, the alkyl groups were straight-chained with the exception of the two $C_8$ alkyl groups which were 2,4,4-tri-methylpentyl groups.

All the above coatings were applied at a 2% level after addition of 0.2% fuel oil.

TABLE Ia

| | | | |
|---|---|---|---|
| 0.2% (Fuel oil+$C_{14}H_{29}Si(OEt)_3$, 10:1) +2% AK clay | XXX | XXXX | XXXX |
| 0.2% (Fuel oil+$C_{14}H_{29}Si(OEt)_3$, 20:1) +1% AK clay treated with 0.5% $C_{14}H_{29}Si(OEt)_3$ | XXX | XXX | XXXX |

NOTE.—X=slight effect; XX=good effect; XXX=equivalent to $AKO_1$ ($AKO_1$ AK ball clay treated with 1% octadecylamine); XXXX=better than $AKO_1$.

A number of the samples containing the $C_1$-, $C_4$- and $C_{14}$-triethoxy silanes of Formula I were also subjected to drilling tests in a static combine drill of 15 rows, the hopper of which was compartmented into five equal-sized sections into each of which a different fertilizer could be placed, thereby permitting five treatments to be evaluated simultaneously. The drill was run for 15 minutes, during which time the fertilizer distributed from each section was collected and weighed; the drill was then left idle for a period of at least 7 hours, in an atmosphere of high humidity, and another 15 minute run performed. In all, each each test consisted of 9 or 12 runs, 2 runs per day. The weight of the fertilizer collected by the end of each run was expressed as a percentage of the weight collected from the appropriate section in the first run.

Figure 1B:
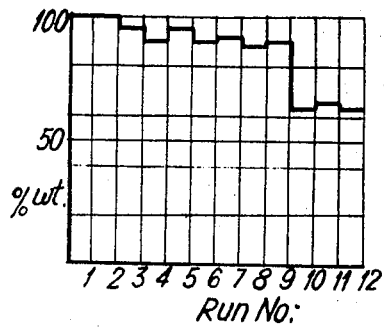
Figure 2A:
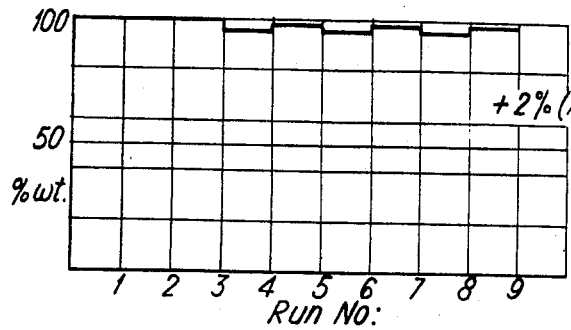
Figure 2B:
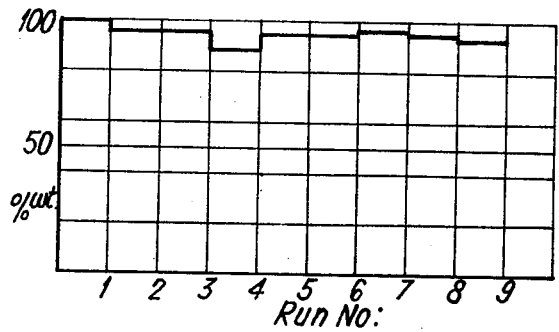
Figure 2C:
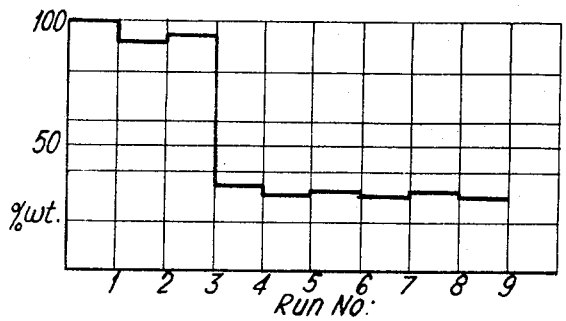
Figure 2D:
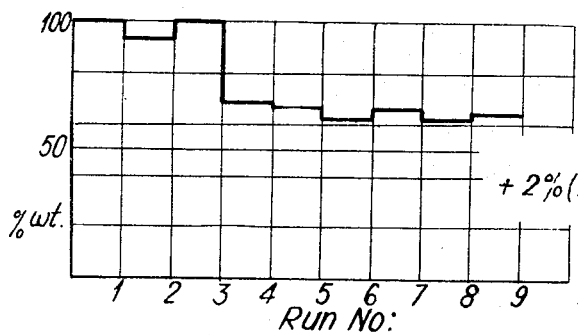
Figure 3A:
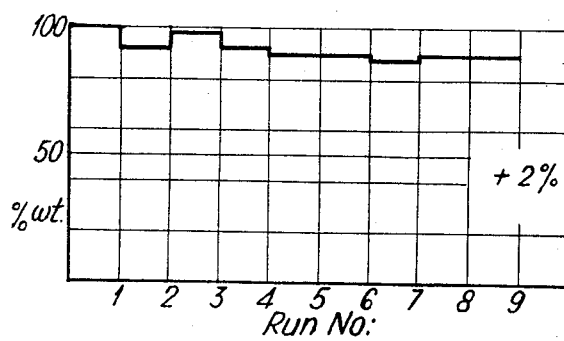
Figure 3B:
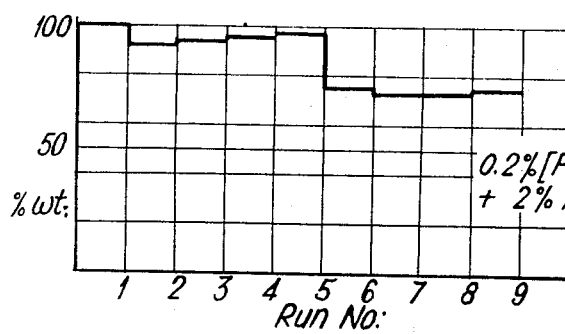

In the first test, over 12 runs, AK ball clay treated with 1% $C_{14}H_{29}Si(OEt)_3$ was compared with $AKO_1$ i.e. AK ball clay treated with 1% octadecylamine, and the results of this test are illustrated in FIGS. 1A and 1B. None of the tubes blocked over the 12 runs.

In the second test, over 9 runs, the following were compared:

(a) "WINNOFIL S" (reg. trademark—calcium carbonate which has been precipitated from an aqueous phase and coprecipitated with stearic acid).
(b) AK ball clay treated with 1% $C_{14}H_{29}Si(OEt)_3$.
(c) AK ball clay treated with 1% $C_4H_9Si(OEt)_3$.
(d) $AKO_1$ i.e. AK ball clay treated with 1% octadecylamine.

The results of this test are illustrated in FIGS. 2A to 2D, and indicate that $C_{14}H_{29}Si(OEt)_3$ is as good as "WINNOFIL S," which, as described in British Pat. No. 1,050,248, is known to impart good drilling properties to the fertilizer, and that even $C_4H_9Si(OEt)_3$ is rather better than octadecylamine.

In the third test, $C_{14}H_{29}Si(OEt)_3$, both in the oil and on the clay, $C_4H_9Si(OEt)_3$ in the oil, and $CH_3Si(OEt)_3$ on the clay, were compared, and the results are illustrated in FIGS. 3A to 3D which indicate that $C_{14}H_{29}Si(OEt)_3$ was very effective. The others, though less effective, did not, it will be observed, cause substantial blockage of the drill.

EXAMPLE II

Each of the following types of material were prepared from granules of a fertilizer having a plant nutrient analysis of 22:11:11 expressed as $N:P_2O_5:K_2O$, the fertilizer being prepared from ammonium nitrate, ammonium phosphate and potassium chloride, and having a moisture content of about 0.3% and a particle size between 1.5 and 3.5 mms.

(1) Coated firstly with 0.3% by weight of the silane or organopolysiloxane and then with 2% by weight of Kaolin GYD-DIS.

(2) Coated with 2% of kaolin containing (a) 2% of the silane or organopolysiloxane, by weight of the kaolin.
(b) 1% of the silane or organopolysiloxane, by weight of the kaolin.

The silanes and organopolysiloxanes were applied to the clay in three different types of equipment, viz (i) a ball mill (ii) a coffee mill (iii) a Winkworth liquid twin-shafted mixer. No difference could be detected between clays treated in these different types of equipment. Each of these materials was stored under conditions simulating storage in polythene bags for two months under 40 bags pressure and was subsequently examined for anti-caking properties and compared with the same fertilizer when coated with 2% untreated Kaolin GYD-DIS and with 2% KOD (Kaolin GYD-DIS treated with 1% of its own weight of octadecylamine).

The results of these anti-caking tests are set out in the following Table II:

TABLE II

| | | Fertilizer coated with 2% kaolin treated with silane or organopolysiloxane | | |
|---|---|---|---|---|
| Chemical formula | 0.3% organopolysiloxane/silane + 2% kaolin | 2% organopolysiloxane/silane | 1% organopolysiloxane/silane | 1% organopolysiloxane/silane (cured kept 1 month) |
| $Me_2Si(OEt)_2$ | XX | X | | XX |
| $MeSi(OEt)_3$ | X | X | | XXX |
| $C_{14}H_{29}Si(OEt)_3$ | XXXX | XXX | XXXX / XX | XX |
| $Me_3SiO[MeHSiO]_{16}SiMe_3$ | XXXX | XXX | XXXX / XX | XX |
| $[MeHSiO]_n$* | XXXX | XXX | | XXX |

*This is a mixture of products having $n=4$ and $n=5$ in the approximate weight ratio 60 to 40.

NOTE.—X=slight effect; XX=good effect; XXX=equivalent to KOD; XXXX=better than KOD.

In addition to the anti-caking tests referred to hereinabove, drilling tests were also carried out in a static drill. The procedure was as detailed in Example I, except that only one run per day was preformed. The fertilizer was coated with 2% kaolin containing the organopolysiloxane $Me_3SiO(SiHMeO)_{16}SiMe_3$ at both ½% and 1% level, and compared with the same fertilizer treated with KOD. The results are illustrated in FIGS. 4A to 4C of the accompanying drawings.

It has also been found that the effect of the silanes and organopolysiloxanes on the finely-divided inert coating material is dependent on time in two ways, viz:

(a) The time that elapses after the silane or organopolysiloxane has been applied to the coating material, and (b) The time that elapses after the treated coating material has been applied to the fertilizer.

The silanes or organopolysiloxanes should therefore be cured onto the coating material before the latter is coated onto the fertilizer; curing after coating will produce an inferior product. Some experiments carried out on fertilizers coated with 2% Kaolin GYD-DIS previously treated with 1% of the cyclic methyl hydrogen siloxane $(MeHSiO)_n$ (this is the same product as that in the last column of Table II) illustrate this in the following Table IIa.

TABLE IIa

| Days after treating clay | 0 | 1 | 2 | 3 |
|---|---|---|---|---|
| Days after coating fertilizer: | | | | |
| 0 | | 37 | 2 | 0 |
| 1 | | 25 | | |
| 2 | | 25 | 1 | |
| 3 | | 26 | | |

NOTE.—The figures refer to "caking values," the lower the value, the better the anti-caking properties. KOD=0.

The mode of the time-dependence was also found to vary with the chemical nature of the organopolysiloxane.

EXAMPLE III

Two 5 lb. batches of AK ball clay and three 5 lb. batches of SC china clay were ball-milled with (a) 5%
(b) 10% of an oil/silane mix, the oil being heavy fuel oil (H.F.O.) or light fuel oil (L.F.O.) and the silane being, in all cases, a triethoxysilane of formula $$C_{14}H_{29}Si(OC_2H_5)_3$$

Granules of the same 22:11:11 fertilizer used in Example II were first coated with either 0.2% or 0.1% by weight of heavy fuel oil, and thereafter with 2% by weight of silane-treated clays, prepared as described hereinabove, to produce the five following batches of coated fertilizer granules:

| Fertilizer Batch No.: | Coating |
|---|---|
| 1 | AK ball clay+4% L.F.O.+1% $C_{14}H_{29}Si(OC_2H_5)_3$. |
| 2 | AK ball clay+4% L.F.O.+1% $C_{14}H_{29}Si(OC_2H_5)_3$. |
| 3 | SC china clay+4% L.F.O.+1% $C_{14}H_{29}Si(OC_2H_5)_3$. |
| 4 | SC china clay+9% L.F.O.+1% $C_{14}H_{29}Si(OC_2H_5)_3$. |
| 5 | SC china clay+4% L.F.O.+1% $C_{14}H_{29}Si(OC_2H_5)_3$. |

In Batch Nos. 1, 2 and 3, the initial heavy fuel oil coating was 0.2% by weight, but in Batch Nos. 4 and 5, this was reduced to 0.1% by weight in order to reduce the overall organic content of the coating.

Each of these fertilizers was stored under conditions simulating storage at both room temperature and at 50° C. in polythene bags for two months under 40 1-cwt. bags pressure and was subsequently examined for anti-caking properties and compared with the same fertilizer when treated with 2% of $AKO_1$ (ball clay AK treated with 1% of its own weight of octadecylamine). The cold-caked and hot-caked samples were also subjected to a float test (a measure of their drillability) in which the coated granules were placed on the surface of a saturated aqueous solution of the fertilizer; those which floated for 3 minutes, or more, are considered to be of acceptable drillability.

The results of these anti-caking and drillability tests are set forth in the following Table III.

TABLE III

| Fertilizer batch No. | Caking room temp. | Caking, 50° C. | Float test |
|---|---|---|---|
| 1 | XX | XX | XXXX |
| 2 | XXX | XXX | XXXX |
| 3 | XXX | XXX | XXXX |
| 4 | XXX | XXX | XXXX |
| 5 | XXX | XXX | XXXX |

NOTE.—X=slight effect; XX=good effect; XXX=equivalent to $AKO_1$; XXXX=better than $AKO_1$.

The five fertilizer batches were also subjected to drilling tests as hereinafter described and, for purposes of comparison, the same drilling tests were simultaneously carried out on the same 22:11:11 fertilizer coated with:

(a) 0.2 heavy fuel oil+2% "FERTEFLO A1" (reg. trademark) (ball clay AK treated with 1% of its own weight of octadecylamine) (two batches).

(b) 0.2% heavy fuel oil+3% "WINNOFIL" (reg. trademark) (calcium carbonate which has been precipitated from an aqueous phase and coprecipitated with stearic acid).

The drilling tests were carried out in a static combine drill of 15 rows, the hopper of which was compartmented into five equal-sized sections into each of which a differently-coated fertilizer could be placed, thereby permitting five treatments to be evaluated simultaneously. The drill was run for 15 minutes, during which time the fertilizer distributed from each section was collected and weighed; the drill was then left idle for a period of at least 7 hours, in an atmosphere of high humidity, and another 15 minute run performed. In all, each test consisted of 11 runs, 2 runs per day. The weight of the fertilizer collected by the end of each run was expressed as a percentage of the weight collected from the appropriate section in the first run.

Figure 5A:
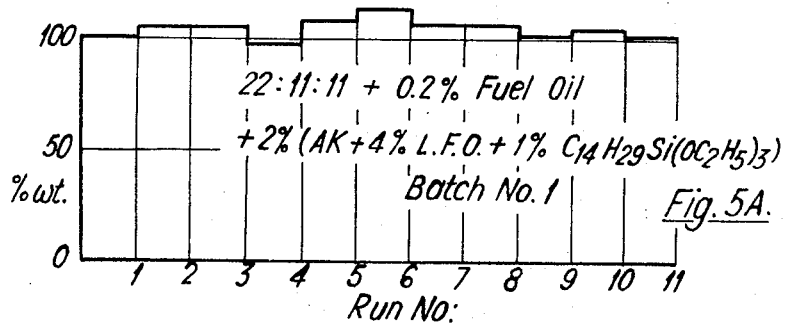
Figure 5B:
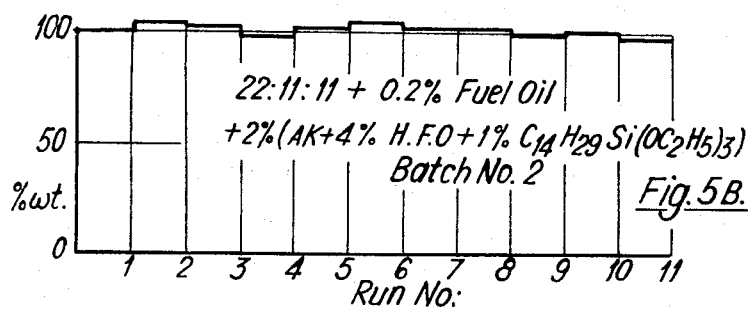
Figure 5C:
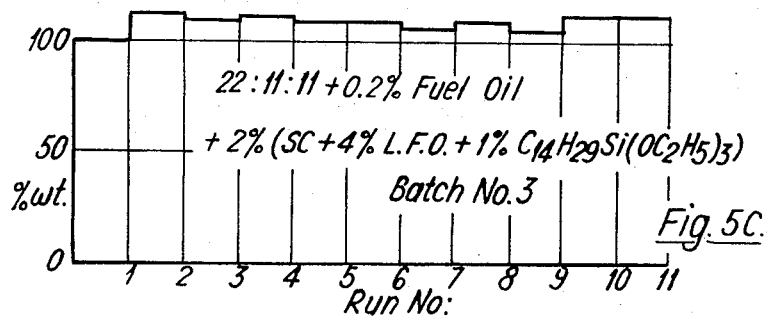
Figure 5D:
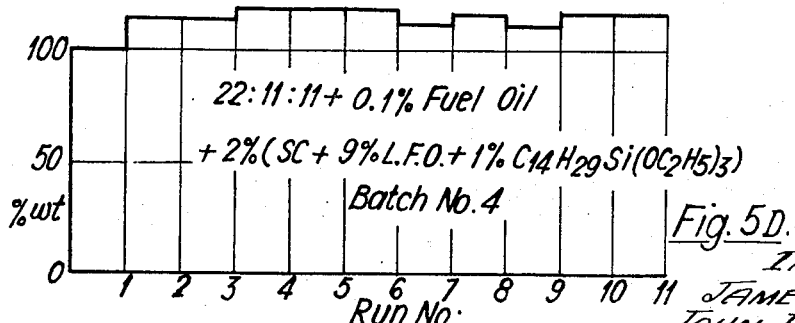

The results of the drilling tests are illustrated in FIGS. 5A to 5H of the accompanying drawings, which demonstrate that the silane-treated fertilizer consistently drilled better than that treated with "FERTEFLO A1" (which, as shown in FIG. 5G, caused blockage of the drill and necessitated cleaning thereof), and at least as well as that treated with "WINNOFIL" which, as described in British Pat. No. 1,050,248, is known to impart good drilling properties to the fertilizer.

EXAMPLE IV

Granules of the same 22:11:11 fertilizer used in Examples II and III were first coated with 0.2% by weight of fuel oil, and thereafter with 2% by weight of the following treated clays:

(A) China clay (SC)+4% liquid paraffin+1% $C_{14}H_{29}Si(OC_2H_5)_3$ (B) Ball clay (AK)+4% liquid paraffin+1% $C_{14}H_{29}Si(OC_2H_5)_3$ Each of these fertilizers was stored and subsequently examined for anti-caking properties and subjected to a float test as described in Example I. In addition, each was subjected to a bottle test as described hereunder. The results of these tests are set forth in the following Table IV.

TABLE IV

| Coating | Caking, room temp. | Caking, 50° C. | Float test | Bottle test |
|---|---|---|---|---|
| A | XXX | XXX | XXXX | XXXX |
| B | XXXX | XXXX | XXXX | XXXX |

NOTE.—X=slight effect; XX=good effect; XXX=equivalent to AKO₁; XXXX=better than AKO₁.

The bottle test referred to consists of mechanically rolling a volume of the granules under test in a 16 oz. bottle containing a specified amount of saturated fertilizer solution for a fixed period of time (usually 1.5 min.). After the specified period the bottle is removed from the rollers and the volume of granules which will flow freely from the bottle is measured. The volume recovered is measured against the volume recovered from a test carried out under similar conditions using "WINNOFIL," the "WINNOFIL" test being taken as a means of comparison.

We claim:
1. The process for preparing fertilizer compositions comprising treating finely divided inert material at about room temperature and without subsequent heat treatment with at least one silicon compound selected from the group consisting of the silane

$$C_{14}H_{29}Si(OC_2H_5)_3$$

and the organopolysiloxane $$Me_3SiO(MeHSiO)_{16}SiMe_3$$

and subsequently coating fertilizer particles with the so-treated finely divided inert material.

2. The process as claimed in claim 1 wherein said finely divided inert material is selected from ground chalk, precipitated calcium carbonate, anhydrite, basic slag, limestone dust, rock phosphate, ball clays or china clays.

3. The process as claimed in claim 1 wherein said finely divided inert material constitutes up to 4% of the weight of the coated fertilizer composition.

4. The process as claimed in claim 1 wherein the proportion of silicon compound by weight of the inert material is at least 0.25%.

5. Process as claimed in claim 1 wherein the fertilizer particles are coated with a layer of oil prior to being coated with the finely divided inert material.

6. The process as claimed in claim 1 wherein said finely divided inert material constitutes from 1% to 3% of the weight of the coated fertilizer composition.

7. The process as claimed in claim 6 wherein the proportion of silicon compound by weight of the finely divided inert material is between about 0.5% and 2%.

8. The process as claimed in claim 1 wherein said silicon compound is dissolved or dispersed in a hydrocarbon solvent or dispersing agent, and said finely divided inert material is treated with the resulting solution or dispersion prior to being coated on the fertilizer particles.

9. The process as claimed in claim 8 wherein said hydrocarbon solvent or dispersing agent is an oil or liquid paraffin.

References Cited

UNITED STATES PATENTS

| | | | |
|---|---|---|---|
| 2,234,489 | 3/1941 | Weinig | 252—384 X |
| 2,500,770 | 3/1950 | Pierce | 71—65 E X |
| 2,604,469 | 7/1952 | Herrmann | 252—384 X |
| 2,647,892 | 8/1953 | La Brie et al. | 252—384 X |
| 2,689,166 | 9/1954 | Rust et al. | 71—64 E X |
| 3,014,783 | 12/1961 | Young | 252—384 X |
| 3,082,154 | 3/1963 | Allan | 252—384 X |

OTHER REFERENCES

Fertilizer Conditioners, Hardesty and Kuuagair, AG. Chemical, February-March 1952, p. 38.

REUBEN FRIEDMAN, Primary Examiner

R. M. BARNES, Assistant Examiner

U.S. Cl. X.R.
117—100 A, 100 B